United States Patent [19]
Shyu et al.

[11] Patent Number: 5,621,870
[45] Date of Patent: Apr. 15, 1997

[54] METHOD AND APPARATUS FOR UNIFORMLY SCALING A DIGITAL IMAGE

[75] Inventors: Rong-Fuh Shyu, Hsin-Chu City; Feng-Ling Chang, Taipei Hsien, both of Taiwan

[73] Assignee: Winbond Electronic Corp., Hsin-Chu Hsien, Taiwan

[21] Appl. No.: 507,755

[22] Filed: Jul. 26, 1995

[51] Int. Cl.$^6$ .................................................. G06T 3/40
[52] U.S. Cl. .......................... 395/139; 395/133; 395/501
[58] Field of Search ..................................... 395/133, 139, 395/127, 151–155, 161–166; 358/11, 180; 348/704; 345/127–130; 382/293, 298

[56] References Cited

U.S. PATENT DOCUMENTS

| | | | |
|---|---|---|---|
| 4,558,347 | 12/1985 | Pritchard et al. | 358/11 |
| 5,089,893 | 2/1992 | Iwase | 358/180 |
| 5,283,651 | 2/1994 | Ishizuka | 348/704 |
| 5,384,904 | 1/1995 | Sprague et al. | 395/139 |

FOREIGN PATENT DOCUMENTS 2064913  6/1981  United Kingdom .

*Primary Examiner*—Almis R. Jankus
*Attorney, Agent, or Firm*—Christensen O'Connor Johnson & Kindness PLLC

[57] ABSTRACT

An apparatus is used to process an original digital image to obtain a uniformly scaled desired digital image, the original digital image having a number (N) of successive original image data while the desired digital image has a number (M) of successive desired image data. When (M) is greater than (N), linear interpolation of (n)th and (n+1)th ones of the original image data is performed to produce a residual interpolated image data inserted therebetween when division of (M–N) by (N–1) results in a remainder (S) and when (n) is a minimum number which meets a condition $(n+1)*(S) \geq (s)*(N)$, wherein (s) ranges from 1 to (S). When (M) is less than (N), an address generator controls a memory unit to output selected ones of the original image data. A succeeding original image data outputted by the memory unit is offset from an immediately preceding original image data outputted thereby by a number (V) or by a number (V+1), the number (V) being equal to a quotient that results from division of (N) by (M).

33 Claims, 9 Drawing Sheets

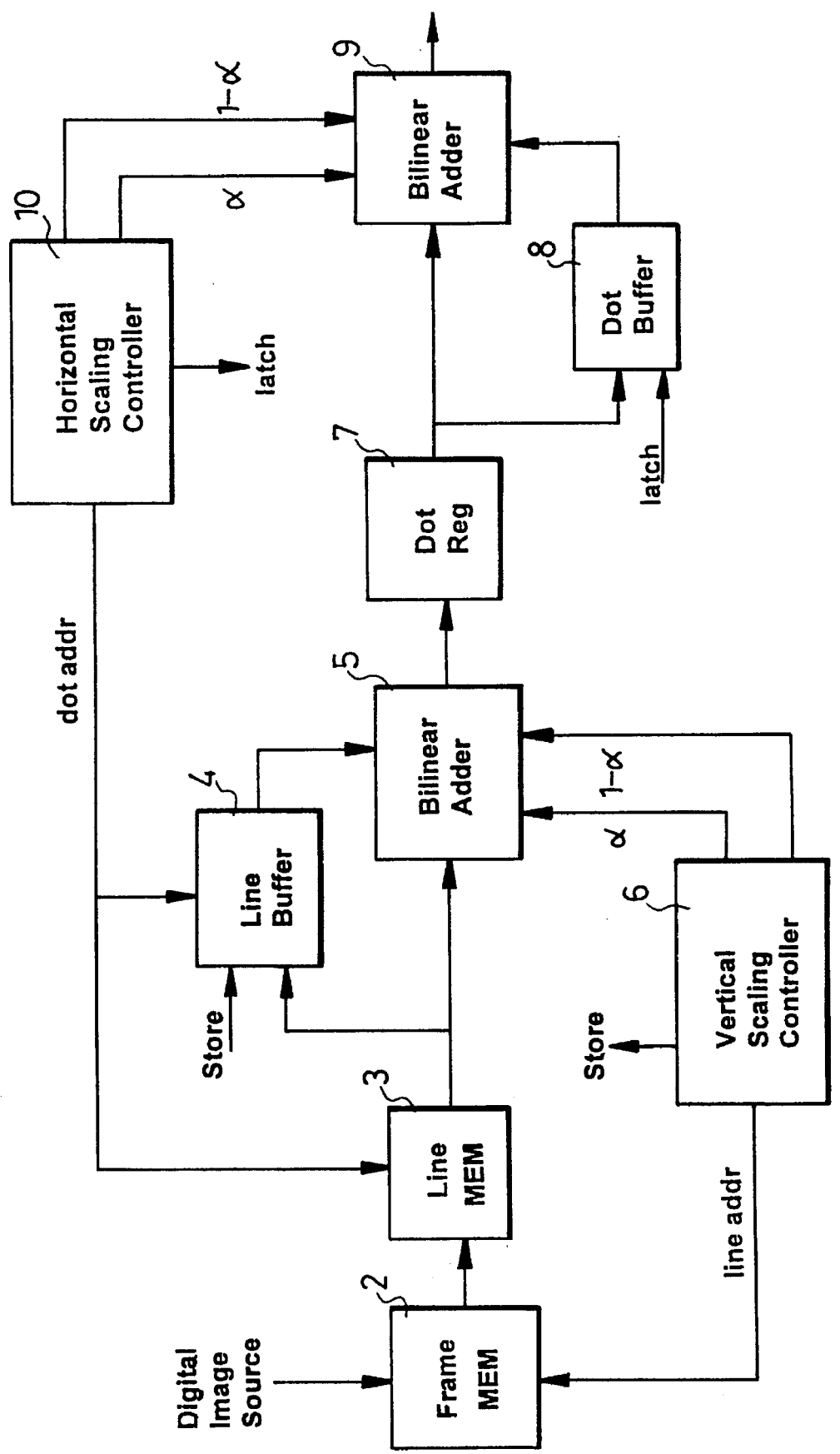
F I G. 1

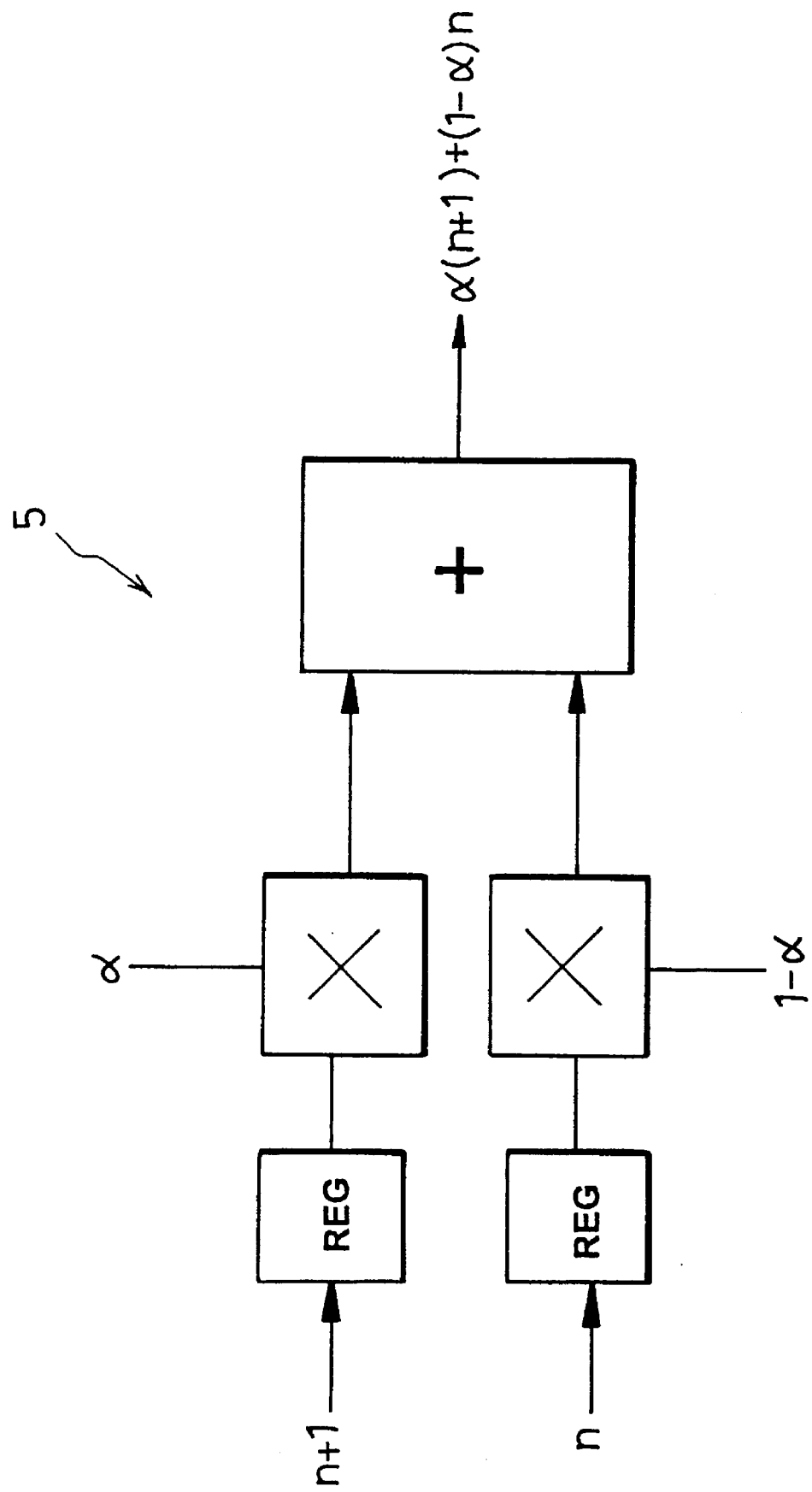
F I G. 2

METHOD AND APPARATUS FOR UNIFORMLY SCALING A DIGITAL IMAGE

BACKGROUND OF THE INVENTION

1. Field of the Invention

The invention relates to an image processing method and apparatus, more particularly to a method and apparatus for uniformly scaling a digital image.

2. Description of the Related Art

The ability to combine digital images is of utmost importance in computer multi-media applications. Usually, a digital image is preprocessed before it can be combined with another digital image. Preprocessing is normally accomplished by increasing the size of the digital image (hereinafter referred to as scaling-up), reducing the size of the digital image (hereinafter referred to as scaling-down), cutting a selected portion of the digital image, shifting the selected portion of the digital image to another location, etc.

Scaling-up and scaling-down of digital images are usually accomplished by a specially-programmed computer. Scaling-up is achieved by performing linear interpolation of every two scan lines of the digital image to obtain at least one interpolated scan line that is inserted therebetween, and by performing linear interpolation of every two pixel data of each scan line to obtain at least one interpolated pixel data that is inserted therebetween. Scaling-down is achieved by deleting some of the scan lines of the digital image, and by deleting some of the pixel data of each of the retained scan lines.

In the scaling-up of digital images, linear interpolation of original image data by the computer is relatively slow. Thus, various dedicated hardware devices, such as those disclosed in European Patent Publication No. 0079542A2 and British Patent Publication No. GB2226471A, have been developed to permit real-time scaling-up of digital images.

One of the drawbacks of these dedicated hardware devices is that they are only capable of scaling-up digital images to a limited extent. When scaling-up a digital image with (N) scan lines, the total number of scan lines to be interpolated must be a multiple of (N−1) so as to permit insertion of an equal number of interpolated scan lines between every two of the original scan lines of the original digital image in order to maintain uniformity. The same is true when scaling-up a scan line with (N') pixel data. Thus, the conventional scaling-up apparatus is incapable of uniformly scaling a digital image with (N) scan lines (or (N') pixel data per scan line) if the total number of interpolated scan lines (or interpolated pixel data per scan line) is not a multiple of (N−1) (or (N'−1)). In addition, the conventional scaling-up apparatus is only capable of scaling-up a digital image in both the horizontal and vertical directions, and is incapable of scaling-down a digital image in any of the horizontal and vertical directions.

SUMMARY OF THE INVENTION

Therefore, the object of the present invention is to provide a method and apparatus for uniformly scaling a digital image.

More specifically, one object of the present invention is to provide a method and apparatus for uniformly scaling-up a digital image in at least one of the horizontal and vertical directions even when the total number of interpolated scan lines or interpolated pixel data per scan line is not a multiple of the original number of scan lines minus 1 or the original number of pixel data per scan line minus 1.

Another object of the present invention is to provide a method and apparatus which is also capable of uniformly scaling-down a digital image in any of the horizontal and vertical directions.

According to one aspect of the present invention, a method for processing an original digital image to obtain a uniformly scaled desired digital image, in which the original digital image has a number (N) of successive original image data and the desired digital image has a number (M) of successive desired image data, and in which the number (M) is greater than the number (N), comprises the steps of: providing a linear interpolator; and controlling the linear interpolator to perform a linear interpolation of (n)th and (n+1)th ones of the original image data to produce a residual interpolated image data inserted therebetween when division of (M−N) by (N−1) results in a remainder (S) and when (n) is a minimum number which meets a condition $(n+1)*(S) \geq (s)*(N)$, wherein (s) ranges from 1 to (S).

According to another aspect of the present invention, a method for processing an original digital image to obtain a uniformly scaled desired digital image, in which the original digital image has a number (N) of successive original image data and the desired digital image has a number (M) of successive desired image data, and in which the number (M) is less than the number (N), comprises the steps of:

(I-1) storing the original image data in a memory unit;

(I-2) providing an address generator which controls the memory unit to output a first one of the original image data;

(I-3) storing a number (U), which is a remainder that results from division of the number (N) by the number (M), in a data register;

(I-4) adding the number (U) and the number stored in the data register to obtain a sum;

(I-5) comparing the sum with the number (M);

(I-6) activating the address generator to control the memory unit to output another one of the original image data offset from an immediately preceding original image data outputted by the memory unit by a number (V) equal to a quotient that results from the division of the number (N) by the number (M) when the sum is less than the number (M), and by a number (V+1) when the sum is at least equal to the number (M);

(I-7) when the sum is at least equal to the number (M), subtracting the number (M) from the sum and storing resulting difference in the data register; and when the sum is less than the number (M), storing the sum in the data register; and (I-8) repeating steps (I-4) to (I-7) until (M) original image data have been outputted by the memory unit.

According to still another aspect of the present invention, an apparatus for processing an original digital image to obtain a uniformly scaled desired digital image, in which the original digital image has a number (N) of successive original image data and the desired digital image has a number (M) of successive desired image data, and in which the number (M) is greater than the number (N), comprises: a linear interpolator; and controller means, connected to the linear interpolator, for controlling the linear interpolator to perform a linear interpolation of (n)th and (n+1)th ones of the original image data to produce a residual interpolated image data inserted therebetween when division of (M−N) by (N−1) results in a remainder (S) and when (n) is a minimum number which meets a condition $(n+1)*(S) \geq (s)*(N)$, wherein (s) ranges from 1 to (S).

According to a further aspect of the present invention, an apparatus for processing an original digital image to obtain a uniformly scaled desired digital image, in which the original digital image has a number (N) of successive original image data and the desired digital image has a number (M) of successive desired image data, and in which the number (M) is less than the number (N), comprises:

a memory unit for storing the original image data therein;

an address generator, connected to the memory unit, for controlling the memory unit to output a first one of the original image data;

generating means for generating a number (U), which is a remainder that results from division of the number (N) by the number (M);

a data register;

adder means, connected to the generating means and the data register, for adding the number (U) and the number stored in the data register to obtain a sum; and computing means, connected to the adder means, the address generator and the data register, for comparing the sum with the number (M) and for activating the address generator to control the memory unit to output another one of the original image data which is offset from an immediately preceding original image data outputted by the memory unit by a number (V) equal to a quotient that results from the division of the number (N) by the number (M) when the sum is less than the number (M), and by a number (V+1) when the sum is at least equal to the number (M); the computing means storing difference of the number (M) and the sum in the data register when the sum is at least equal to the number (M), and storing the sum in the data register when the sum is less than the number (M).

BRIEF DESCRIPTION OF THE DRAWINGS

Other features and advantages of the present invention will become apparent in the following detailed description of the preferred embodiment, with reference to the accompanying drawings, of which:

FIG. 1 is a schematic circuit block diagram of the preferred embodiment of a scaling apparatus according to the present invention;

FIG. 2 is a schematic circuit block diagram of a bilinear adder of the preferred embodiment;

DETAILED DESCRIPTION OF THE PREFERRED EMBODIMENT

Figure 3:
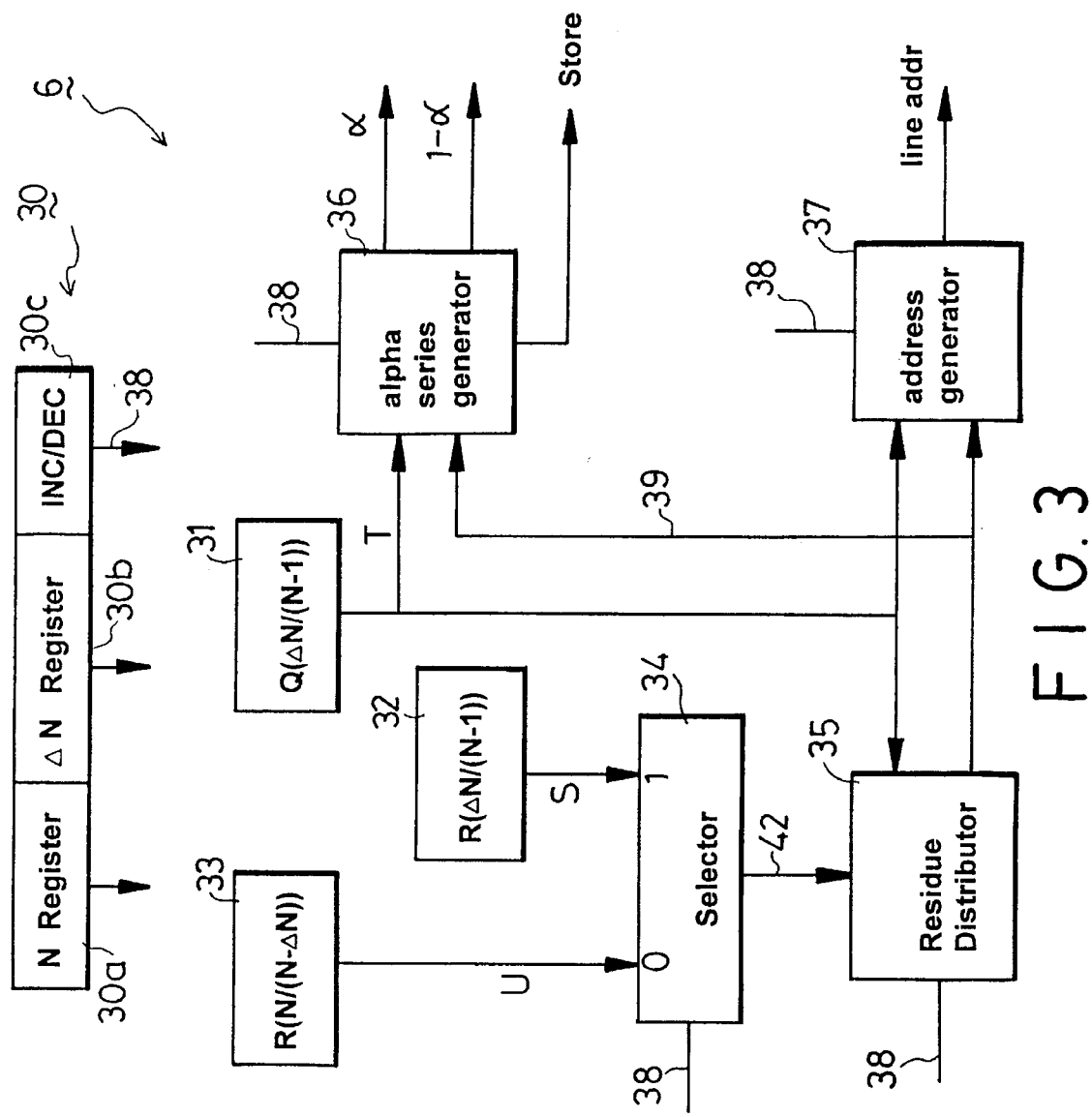
FIG. 3 is a schematic circuit block diagram of a scaling controller of the preferred embodiment.

Referring to FIG. 1, the preferred embodiment of an apparatus for uniformly scaling a digital image in accordance with the present invention is shown to comprise a vertical scaling unit and a horizontal scaling unit. The vertical scaling unit is capable of scaling-up or scaling-down a digital image in a vertical direction and includes a line memory 3, a line buffer 4, a bilinear adder 5 and a vertical scaling controller 6. The horizontal scaling unit is capable of scaling-up or scaling-down a digital image in a horizontal direction and includes a dot register 7, a dot buffer 8, a bilinear adder 9 and a horizontal scaling controller 10.

In use, a digital image to be processed with the use of the apparatus of the preferred embodiment is initially stored in a frame memory 2. The digital image may be from an image decoder or an image capturing system. The vertical scaling controller 6 controls the frame memory 2 to provide a selected scan line of the digital image to the line memory 3. The vertical scaling controller 6 further controls the line buffer 4 to store a previous scan line from the line memory 3 therein. The bilinear adder 5 receives scan line data from the line memory 3 and the line buffer 4, and performs bilinear interpolation according to a pair of weighing coefficients $\alpha$, $1-\alpha$ from the vertical scaling controller 6.

FIG. 2 is a schematic circuit block diagram of the bilinear adder 5. As shown, scan line data from the line buffer 4, which corresponds to an (n)th scan line of the digital image in the frame memory 2, is multiplied by the coefficient $1-\alpha$, while scan line data from the line memory 3, which corresponds to an (n+1)th scan line of the digital image in the frame memory 2, is multiplied by the coefficient $\alpha$. The resulting products are then added to obtain an interpolated scan line when the coefficient $\alpha$ is a fraction, i.e. not equal to 0 or 1. The operation of the bilinear adder 5 will be described in greater detail in the succeeding paragraphs.

Referring to FIG. 3, the vertical scaling controller 6 is shown to comprise a programmable register set 30 which includes a first register 30a for storing the number (N) of original scan lines of the digital image in the frame memory 2, a second register 30b for storing the number (▲N) of scan lines to be interpolated or deleted, and a third register 30c for storing an INC/DEC flag 38 that is used to indicate whether scaling-up or scaling-down of the digital image in a vertical direction is to be performed. The vertical scaling controller 6 further includes first, second and third computing circuits 31, 32, 33 which read the contents of the first, second and third registers 30a, 30b, 30c. The first computing circuit 31 outputs a quotient T resulting from division of (▲N) by (N−1), while the second computing circuit 32 outputs a remainder S resulting from the division of (▲N) by (N−1). The quotient T corresponds to the minimum number of interpolated scan lines to be inserted between every two original scan lines of the digital image stored in the frame memory 2, and the remainder S corresponds to the total number of residual interpolated scan lines to be distributed uniformly among the original scan lines of the digital image stored in the frame memory 2 when the digital image is scaled-up. The third computing circuit 33 outputs a remainder U resulting from division of (N) by (N−▲N). The remainder U corresponds to the total number of residual scan lines to be deleted from the digital image stored in the frame memory 2 when the digital image is scaled-down.

A two-input selector 34 has a first input which receives the remainder U from the third computing circuit 33 and a second input which receives the remainder S from the second computing circuit 32. The selector 34 further has a control input which receives the INC/DEC flag 38 from the third register 30c. The output 42 of the selector 34 is received by a residue distributor 35. The residue distributor 35 further receives the quotient T from the first computing circuit 31, and has a control input which receives the INC/DEC flag 38 from the third register 30c, and a control output 39 which is connected to an alpha series generator 36 and an address generator 37. The residue distributor 35 determines when a residual interpolation step is to be performed during scaling-up of the digital image and when a residual scan line is to be deleted during scaling-down of the digital image. The alpha series generator 36 receives the quotient T from the first computing circuit 31 and the INC/DEC flag 38 from the third register 30c, and generates the coefficients $\alpha$, $1-\alpha$ for the bilinear adder 5 and a store command signal for the line buffer 4 (see FIG. 1). The address generator 37 also receives the quotient T from the first computing circuit 31 and the INC/DEC flag 38 from the third register 30c, and provides line address data to the frame memory 2.

Figure 4:
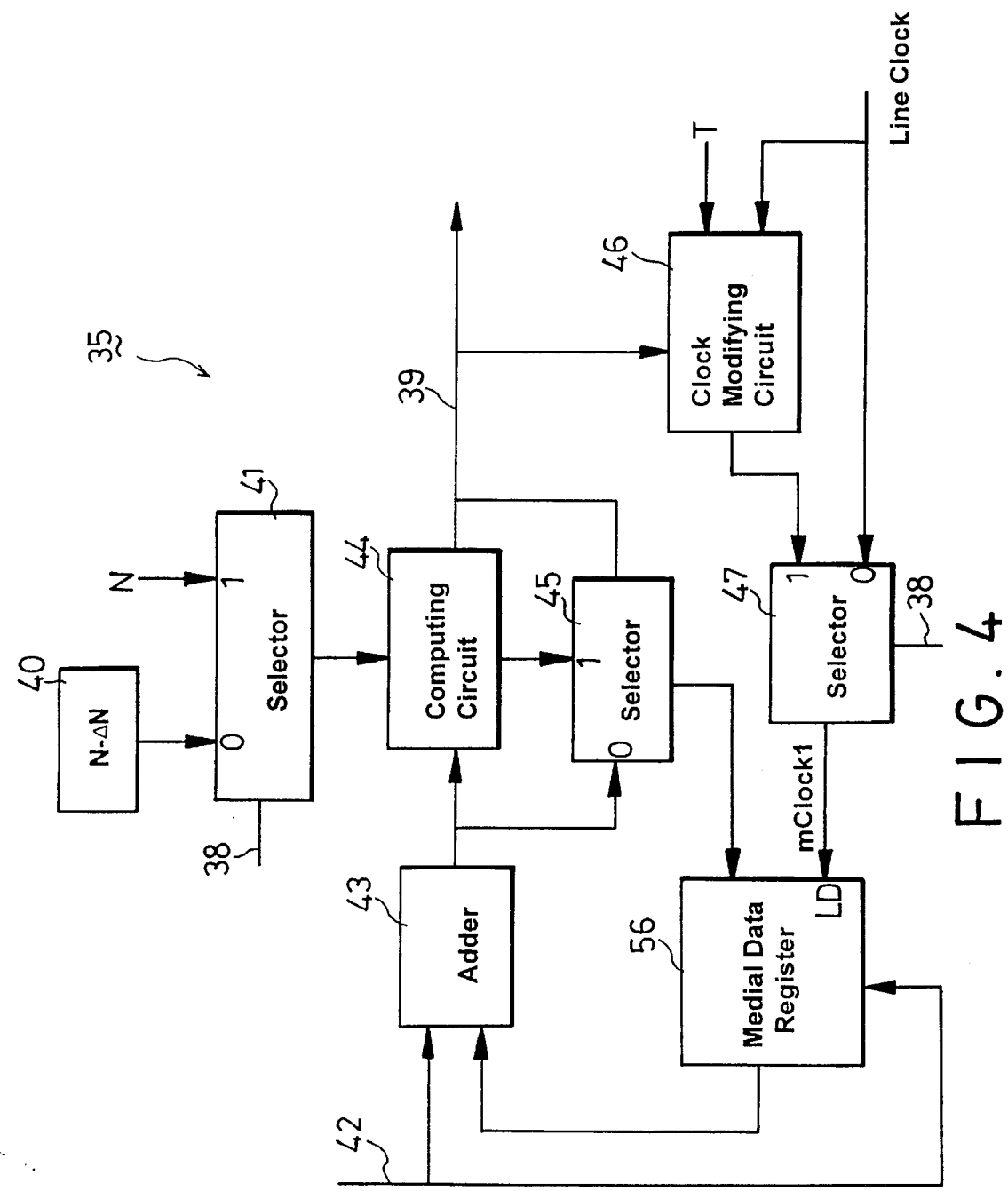
FIG. 4 is a schematic circuit block diagram of a residue distributor of the scaling controller.

Referring to FIG. 4, the residue distributor 35 comprises a computing circuit 40 which outputs the difference of (N) and ($\blacktriangle$N), and a two-input selector 41 which has a first input that receives the output of the computing circuit 40, a second input that receives the number (N) from the first register 30a, and a control input that receives the INC/DEC flag 38 from the third register 30c. A medial data register 56 receives the output 42 of the selector 34 (see FIG. 3) and has an output connected to one of the inputs of a two-input adder 43. The other input of the adder 43 receives the output 42 of the selector 34. The output of the adder 43 and the output of the selector 4 serve as inputs to a computing circuit 44 which deducts the latter from the former and which generates an enable signal at a control output 39 thereof when the output of the adder 43 is larger than or equal to the output of the selector 41. A two-input selector 45 has a first input that receives the output of the adder 43, a second input that receives the difference of the outputs of the adder 43 and the selector 4 from the computing circuit 44, a control input that is connected to the control output 39 of the computing circuit 44, and an output that is connected to the medial data register 56.

A clock modifying circuit 46 receives the original input line clock and modifies the latter in accordance with the signal at the control output 39 and the quotient T from the first computing circuit 31. When the control output 39 is in a logic high state, the clock modifying circuit 46 outputs a divide-by-(T+2) clock that has a duration of (T+2) times of the original input line clock, and when the control output 39 is in a logic low state, the clock modifying circuit 46 outputs a divide-by-(T+1) clock that has a duration of (T+1) times of the original input line clock. The output of the clock modifying circuit 46 and the original input line clock serve as inputs to a selector 47. The INC/DEC flag 38 from the third register 30c serves as the control input of the selector 47. The medial data register 56 has a load pin LD that receives a clock signal mClock1 from the selector 47.

Figure 5:
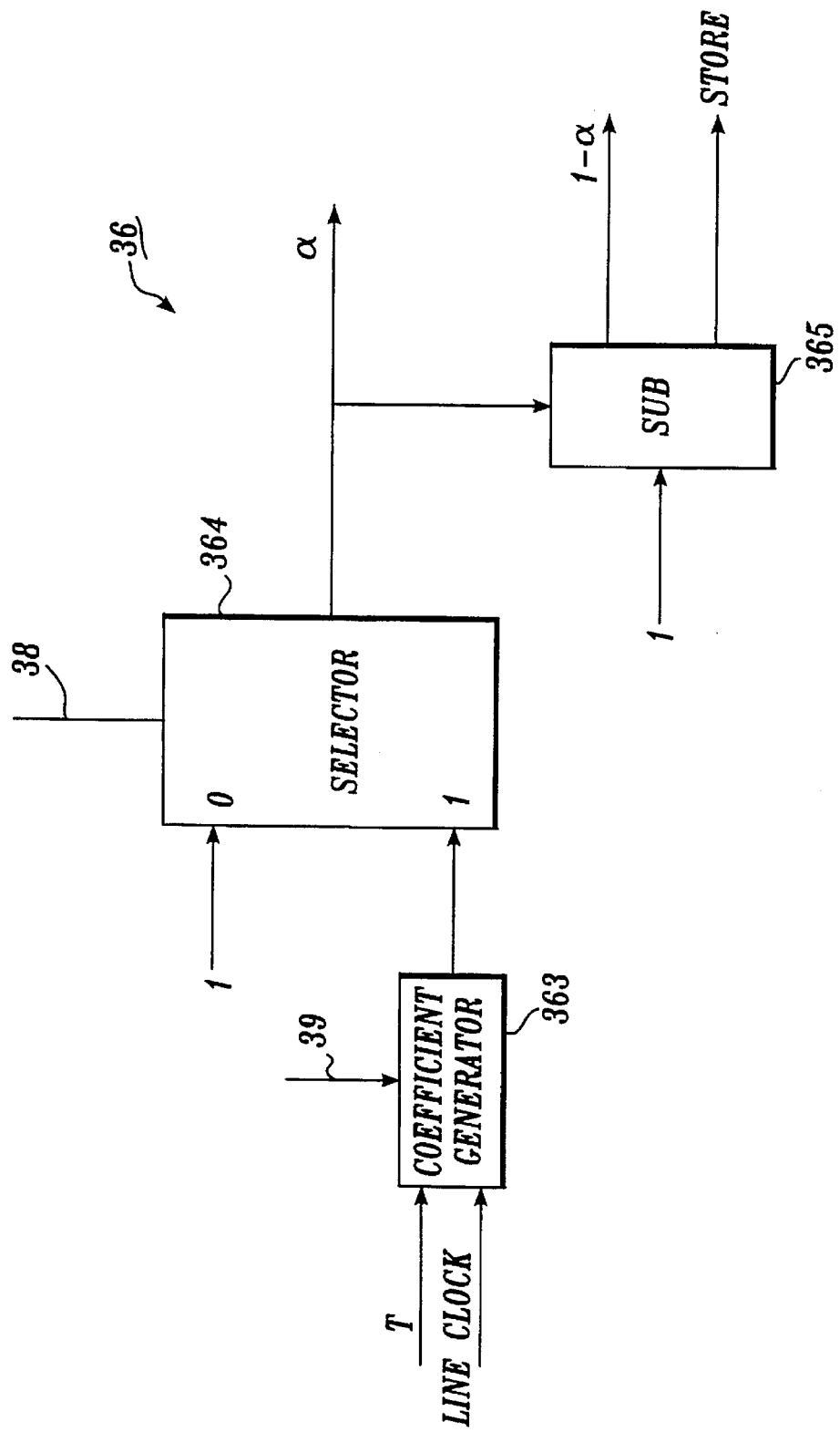
FIG. 5 is a schematic circuit block diagram of an alpha series generator of the scaling controller.

Referring to FIG. 5, the alpha series generator 36 includes a coefficient generator 363 which is connected to the control output 39 of the computing circuit 44 and which receives the original input line clock and the quotient T from the first computing circuit 3. When the control output 39 is in a logic high state, the coefficient generator 363 generates consecutive 1, 1/(T+2), 2/(T+2), ... (T+1)/(T+2) alpha coefficients respectively in consecutive (T+2) line clock periods, and when the control output 39 is in a logic low state, the coefficient generator 363 generates consecutive 1, 1/(T+1), 2/(T+1), ... (T)/(T+1) alpha coefficients respectively in consecutive (T+1) line clock periods. A selector 364 has a first input fixed to 1, a second input that receives the output of the coefficient generator 363, and a control input that receives the INC/DEC flag 38. The output of the selector 364 is the coefficient $\alpha$ and serves as one of the inputs to a subtracting circuit 365. The other input of the subtracting circuit 365 is fixed to 1. One of the outputs of the subtracting circuit 365 is the coefficient $1-\alpha$. The other output of the subtracting circuit 365 is the store command signal for the line buffer 4 (see FIG. 1). The subtracting circuit 365 generates the store command signal when the coefficient $1-\alpha$ is equal to zero, i.e. $\alpha=1$.

Figure 6:
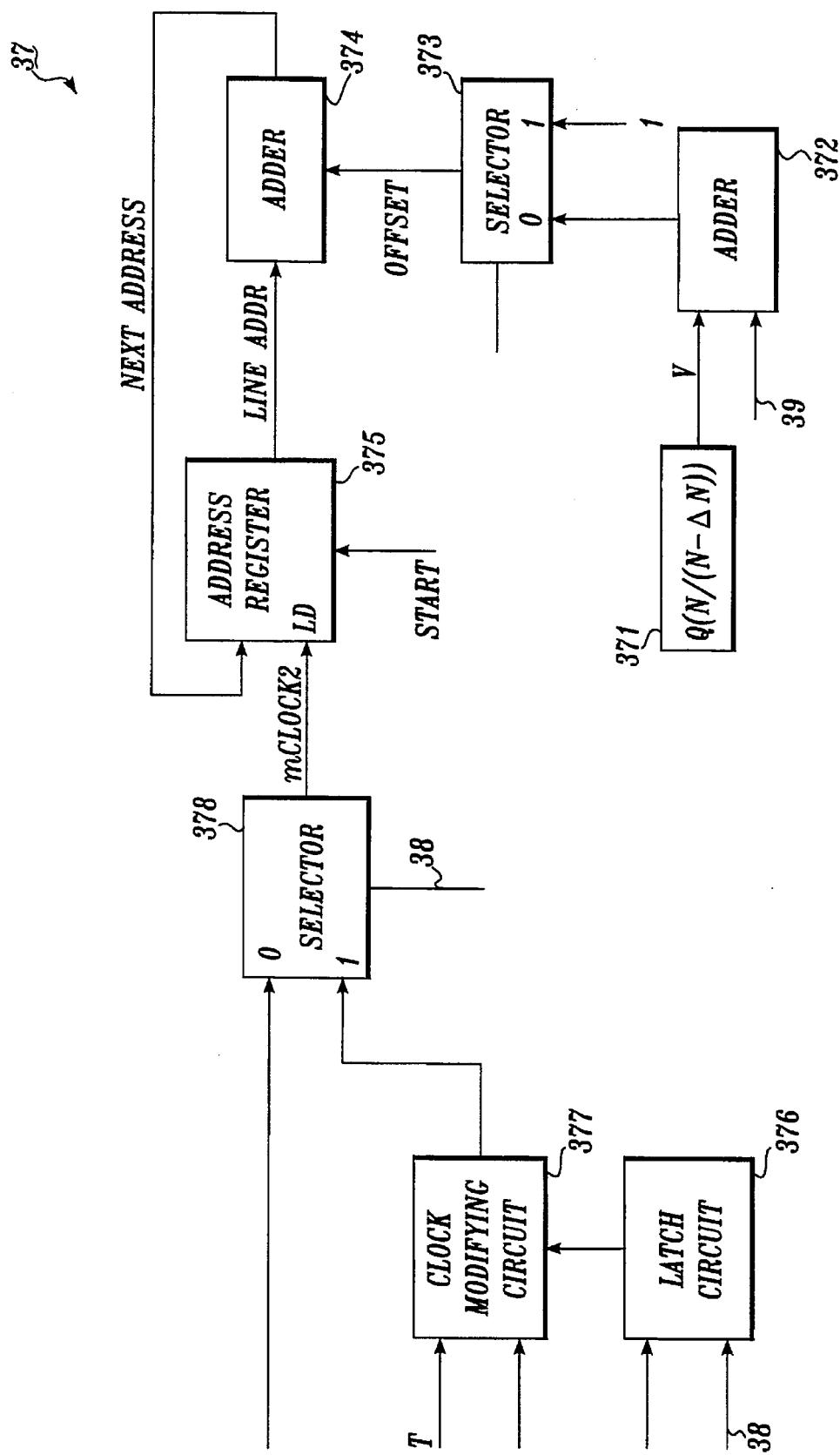
FIG. 6 is a schematic circuit block diagram of an address generator of the scaling controller.

Referring to FIG. 6, the address generator 37 includes a computing circuit 37 which outputs a quotient V resulting from the division of (N) by (N−$\blacktriangle$N). The quotient V corresponds to an offset number between two selected scan lines of the digital image in the frame memory 2 when the digital image is scaled-down. The quotient V and the control output 39 serve as inputs to an adder 372. The output of the adder 372 serves as one of the inputs to a selector 373. The other input of the selector 373 is fixed to 1. The INC/DEC flag 38 serves as a control input of the selector 373. The selector 373 generates an offset number which is provided to an adder 374. The output of the adder 374 is connected to an address register 375. The output of the address register 375 is the line address data and, in turn, is received by the adder 374. The address register 375 has a Start input to preset a line address of the first one of the original scan lines stored in the frame memory 2. The address register 375 further has a load pin LD for controlling the storing of a next address therein.

A latch circuit 376 samples and holds the signal at the control output 39 according to the original input line clock. A clock modifying circuit 377 receives the original input line clock and modifies the latter in accordance with the output of the latch circuit 376 and the quotient T from the first computing circuit When the output of the latch circuit 376 is in a logic high state, the clock modifying circuit 377 outputs a divide-by-(T+2) clock that has a duration of (T+2) times of the original input line clock, and when the output of the latch circuit 376 is in a logic low state, the clock modifying circuit 377 outputs a divide-by-(T+1) clock that has a duration of (T+1) times of the original input line clock. A selector 378 receives the original input line clock and the output of the clock modifying circuit 377, and is controlled by the INC/DEC flag 38 to output one of the inputs thereto as a clock input mClock2 that is received by the address register 375 at the load pin LD.

The operation of the vertical scaling unit is now described as follows:

A. In order to facilitate explanation of the scaling-up operation of the preferred embodiment, an example in which an original digital image with five original scan lines is scaled-up so as to obtain a desired digital image with seven desired scan lines is provided.

Referring to FIG. 3, the programmable register set 30 is initially programmed by storing the number "5" in the first register 30a, the number "2" in the second register 30b, and a logic "1" in the third register 30c. The number "5" corresponds to the number (N) of original scan lines of the original digital image in the frame memory 2. The number "2" corresponds to the total number ($\blacktriangle$N) of scan lines to be interpolated. The logic "1" in the third register 30c indicates that scaling-up of the original digital image is to be performed.

The first computing circuit 31 outputs the quotient T resulting from the division of (▲N) by (N−1). Since (▲N) is less than (N−1), the quotient T is 0. The second computing circuit 32 outputs the remainder S resulting from the division of (▲N) by (N−1). In this example, the remainder S is equal to 2. The output of the third computing circuit 33 is irrelevant since the selector 34 provides the output of the second computing circuit 32 to the residue distributor 35 during the scale-up operation.

Referring to FIG. 1 and to FIGS. 3 to 7, the address register 375 of the address generator 37 initially sets the line address of a first one of the original scan lines stored in the frame memory 2 and controls the frame memory 2 to provide the first one of the original scan lines to the line memory 3 during a starting line clock. At the same time, the remainder S is stored in the medial data register 56, and the adder 43 then adds the remainder S and the contents of the medial data register 56. Since the output of the adder 43, which is equal to 4 at this time, is less than the number (N), which is equal to 5, the control output 39 of the computing circuit 44 is at a low logic state. The selector 45 provides the output of the adder 43 to the medial data register 56, and the clock input mClock1 provided to the medial data register 56 is the divide-by-(T+1) clock, which is exactly the same as the original input line clock since the quotient T is equal to 0.

Because the control output 39 is at a low logic state, and since the quotient T is equal to 0, the coefficient generator 363 provides the number "1" to the selector 364. Since the INC/DEC flag 38 is at a logic "1", the selector 364 chooses the output of the coefficient generator 363 as the weighing coefficient α. Since the coefficient α is equal to 1, the coefficient 1-α is equal to 0, and the store command signal is generated so as to control the line buffer 4 to store the first one of the original scan lines from the line memory 3 therein. The output of the bilinear adder 5 at this stage is the first one of the original scan lines.

The selector 373 provides an offset number, which is equal to 1, to the adder 374. The adder 374 thus increments the output of the address register 375 by one unit when the next clock pulse mClock2 arrives, thereby controlling the frame memory 2 to provide a second one of the original scan lines to the line memory 3.

Upon arrival of the next clock pulse mClock1, the medial data register 56 stores the previous output of the adder 43, which is the number "4," therein. At this time, the output of the adder 43, which is now equal to 6, is larger than the number (N), which is equal to 5, such that the control output 39 of the computing circuit 44 is at a high logic state. The selector 45 provides the difference of the outputs of the adder 43 and the selector 41 to the medial data register 56, and the clock input mClock1 to the medial data register 56 is now the divide-by-(T+2) clock, the duration of which is twice the duration of the original input line clock.

Now that the control output 39 is at a high logic state, the coefficient generator 363 generates successively two outputs, 1 and ½, within one mClock1 pulse, that is, two consecutive original input line clocks. Within the first original input line clock, the bilinear adder 5 outputs the second one of the original scan lines and, at the same time, the latter is stored in the line buffer 4 since the coefficient e is equal to 1. Within the second original input line clock, the contents of the address register 375 are incremented by one unit upon reception of the next mClock2 pulse to control the frame memory 2 to provide a third one of the original scan lines to the line memory 3. At this time, the output of the coefficient generator 363 is equal to ½, the coefficient α is equal to, the coefficient 1-α is equal to ½, and no store command signal is generated. Thus, the second one of the original scan lines remains in the line buffer 4. The output of the bilinear adder 5 at this stage is the bilinear interpolation of the second and third ones of the original scan lines.

The contents of the medial data register 56 are updated so as to become 1, which is the difference of the output of the adder 43 and the number (N), when the next mClock1 pulse arrives. The output of the adder 43 is 3, which is less than the number (N), such that the control output 39 is at a low logic state. The selector 45 provides the output of the adder 43 to the medial data register 56, the clock input mClock1 provided to the medial data register 56 is the divide-by-(T+1) clock, and the coefficient α from the alpha series generator 36 is equal to 1. The output of the bilinear adder 5 is the third one of the original scan lines and, because the coefficient is equal to 1, the third one of the original scan lines is stored in the line buffer 4.

The succeeding steps are similar to the foregoing until the fifth one of the original scan lines has been outputted by the bilinear adder 5.

Figure 7:
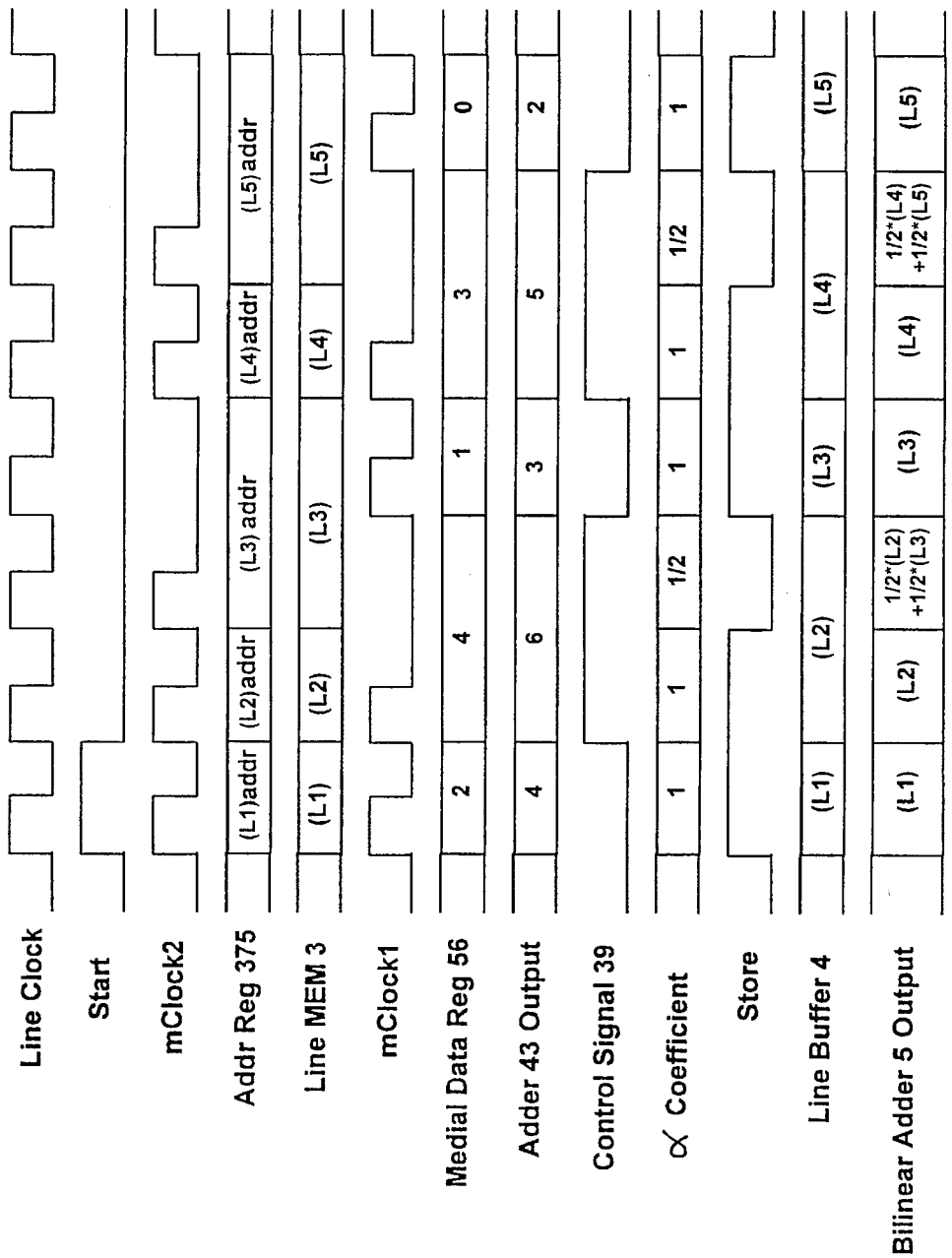
FIG. 7 is a timing diagram illustrating the scaling-up operation of the preferred embodiment when N=5 and ▲N=2.

FIG. 7 is a timing diagram which illustrates the scaling-up operation of the preferred embodiment for this example, that is N=5 and ▲N=2.

It has thus been shown that the vertical scaling controller 6 controls the bilinear adder 5 to perform bilinear interpolation of an (n)th one of the original scan lines, which is stored in the line buffer 4, and an (n+1)th one of the original scan lines, which is stored in the line memory 3, so as to produce a residual interpolated scan line that is inserted between the (n)th and (n+1)th ones of the original scan lines when division of (▲N) by (N−1) results in a remainder (S), and when (n) is a minimum number that meets the condition $(n+1)*(S) \geq (s)*(N)$, wherein (s) ranges from 1 to (S).

Figure 8:
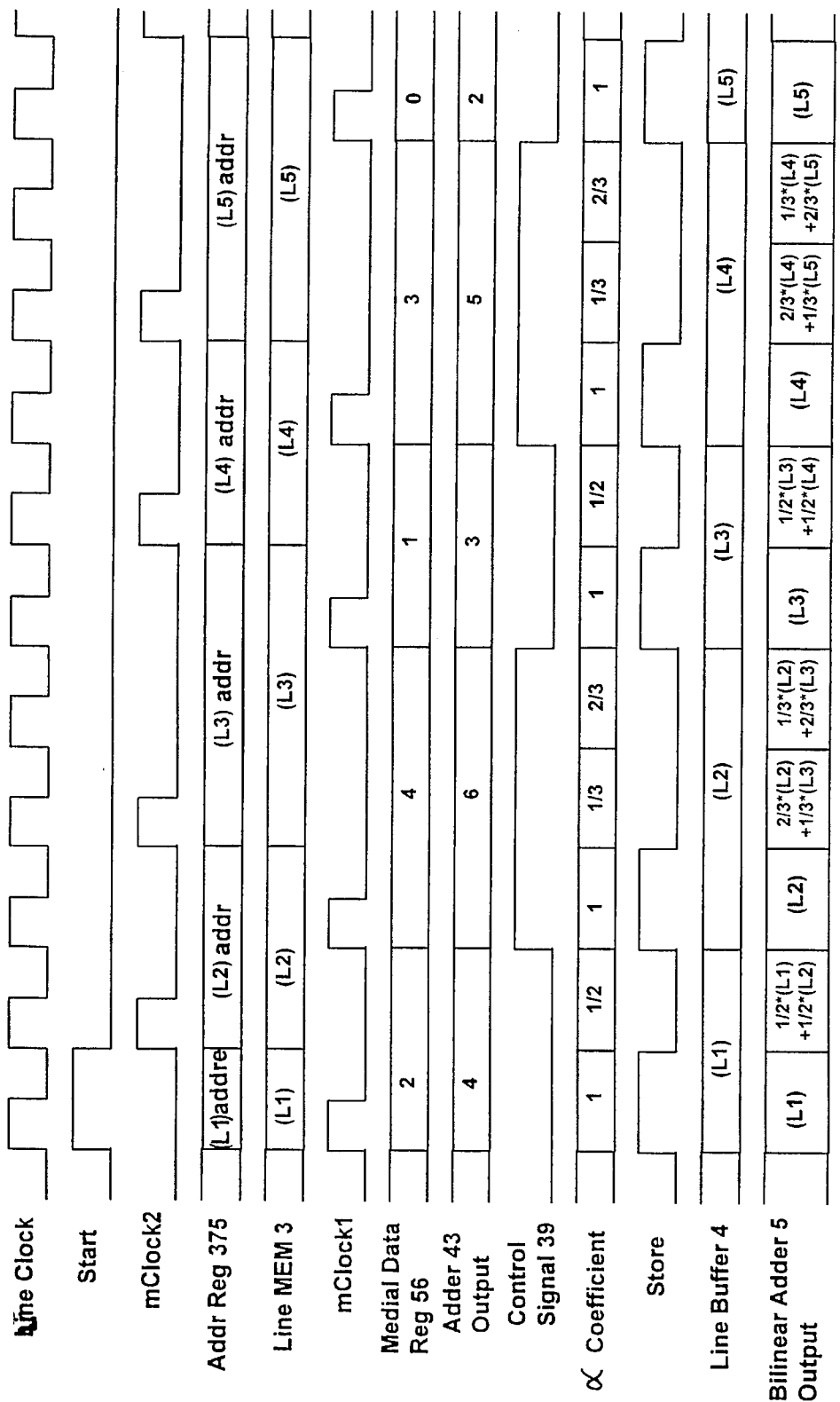
FIG. 8 is a timing diagram illustrating the scaling-up operation of the preferred embodiment when N=5 and ▲N=6.

In the preceding example, the quotient (T) resulting from the division of (▲N) by (N−1) is 0. If the quotient T is not zero, that is, (▲N) is greater than or equal to (N−1), the vertical scaling controller 6 controls the bilinear adder 5 to perform bilinear interpolation of the (n)th and (n+1)th ones of the original scan lines so as to produce an additional number T of successive interpolated scan lines that are inserted between the (n)th and (n+1)th ones of the original scan lines. FIG. 8 illustrates a timing diagram of a sample scaling-up operation performed by the preferred embodiment when N=5 and ▲N=6. In this example, the quotient T is equal to 1, and the remainder S is equal to 2. Obviously, there is an additional interpolated scan line inserted between every interval of the (n)th and (n+1)th ones of the original scan lines.

B. In order to facilitate explanation of the scaling-down operation of the preferred embodiment, an example in which an original digital image with five original scan lines is scaled-down so as to obtain a desired digital image with three desired scan lines is provided.

Referring to FIG. 3, the programmable register set 30 is initially programmed by storing the number "5" in the first register 30a, the number "2" in the second register 30b, and a logic "0" in the third register 30c. The number "5" corresponds to the number (N) of original scan lines of the original digital image in the frame memory 2. The number "2" corresponds to the total number (▲N) of scan lines to be deleted. The logic "0" in the third register 30c indicates that scaling-down of the original digital image is to be performed.

The outputs of the first and second computing circuits 31, 32 are irrelevant during the scale-down operation. The third computing circuit 33 outputs the remainder U resulting from the division of (N) by (N−▲N), (N−▲N) being the number of original scan lines to be retained. In this example, the remainder U is equal to 2. The selector 34 provides the output of the third computing circuit 33 to the residue distributor 35.

Figure 9:
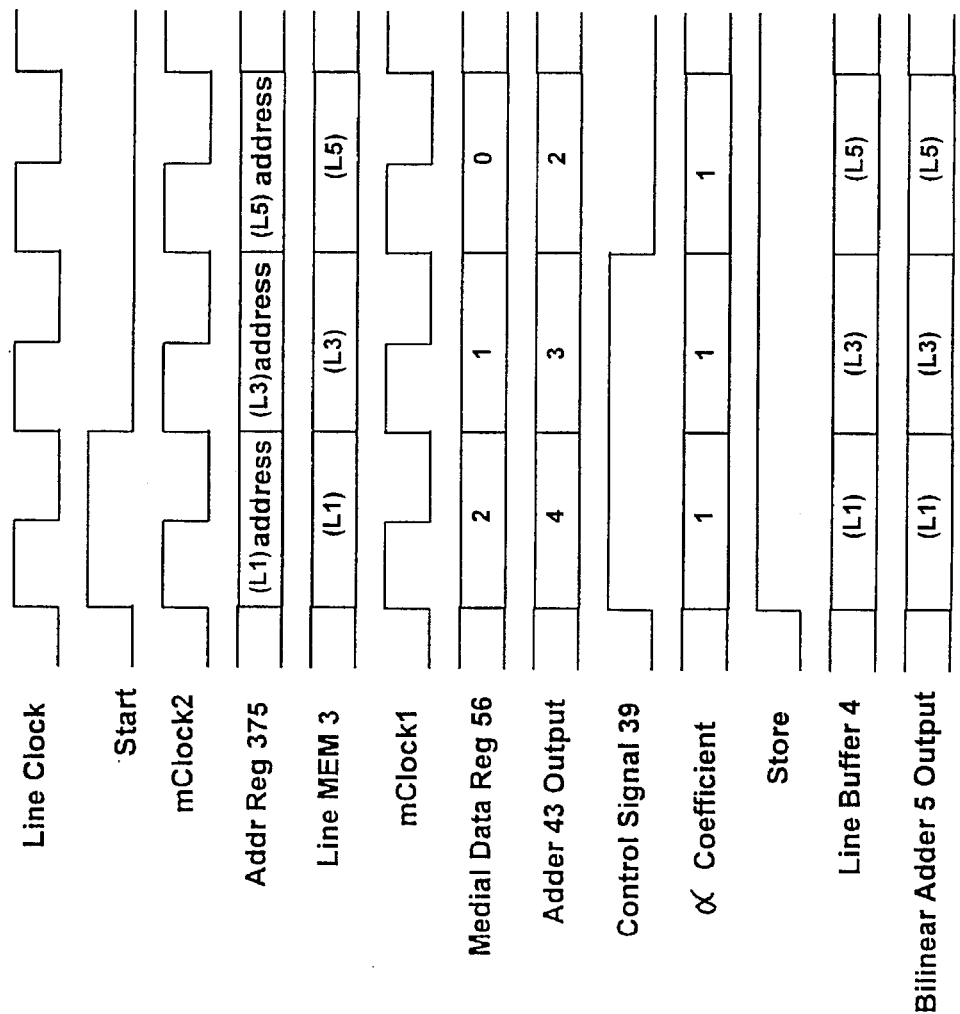
FIG. 9 is a timing diagram illustrating the scaling-down operation of the preferred embodiment when N=5 and ▲N=2.

Referring to FIG. 1, FIGS. 3 to 6, and to FIG. 9, the address register 375 of the address generator 37 initially sets the line address of a first one of the original scan lines stored in the frame memory 2 and controls the frame memory 2 to provide the first one of the original scan lines to the line memory 3 during a starting line clock. At the same time, the remainder U is stored in the medial data register 56, and the adder 43 then adds the remainder U and the contents of the medial data register 56. The computing circuit 44 subtracts the number (N−▲N) from the selector 41 from the output of the adder 43. Since the output of the adder 43, which is equal to 4 at this time, is greater than the number (N−▲N), which is equal to 3, the control output 39 of the computing circuit 44 is in a high logic state. The selector 45 provides the difference of the outputs of the adder 43 and the selector 41 to the medial data register 56. The original line clock is supplied to the medial data register 56 via the selector 47.

Referring to FIGS. 3 and 5, because a logic "0" is stored in the third register 30c, the selector 364 maintains the coefficient α at 1. The coefficient 1-α is thus equal to 0, and the store command signal is always generated so as to activate the line buffer 4 to store continuously an original scan line from the line memory 3 therein. In addition, the output of the bilinear adder 5 is always the output of the line memory 3.

Referring to FIG. 6, the computing circuit 37 outputs the quotient V resulting from the division of (N) by (N−▲N). In this example, the quotient V is equal to 1. The adder 372 generates the sum of the quotient V and the logic state of the control output 39, which is currently at a high logic state. The selector 373 chooses the output of the adder 372, which is equal to 2, and provides the same to the adder 374. Thus, the output of the address register 375 is incremented by two units when the next mClock2 pulse arrives, thereby controlling the frame memory 2 to provide the third one of the original scan lines to the line memory 3.

Referring again to FIG. 4, upon arrival of the next line clock pulse, the medial data register 56 stores the number "1," which is the previous difference computed by the computing circuit 44, therein. At this time, the output of the adder 43, which is equal to 3, is equal to the output of the selector 41. The control output 39 of the computing circuit 44 is at a high logic state, and the selector 45 provides the difference of the outputs of the adder 43 and the selector 41 to the medial data register Referring again to FIG. 6, the adder 372 once more generates the sum of the quotient V and the current logic state of the control output 39. The output of the adder 372, which is equal to 2, is provided to the adder 374 via the selector 373. Thus, the output of the address register 375 is again incremented by two units when the next mClock2 pulse arrives, thereby controlling the frame memory 2 to provide the fifth one of the original scan lines to the line memory 3. FIG. 9 is a timing diagram which illustrates the scaling-down operation of the preferred embodiment for this example, that is N=5 and ▲N=2.

From the foregoing, it has been shown that the address generator 37 controls the frame memory 2 to output only chosen ones of the original scan lines. The original scan lines which were not outputted by the frame memory 2 are, in effect, discarded. It is noted that the original scan line to be outputted by the frame memory 2 is offset from an immediately preceding original scan line that was outputted by the latter by the number V when the output of the adder 43 is less than the difference (N−▲N), and by the number (V+1) when the output of the adder 43 is at least equal to the difference (N−▲N).

The structure and operation of the horizontal scaling unit will now be described as follows:

The output of the bilinear adder 5 is received by the dot register 7. The horizontal scaling controller 10 controls the dot buffer 8 to store a previous pixel data from the dot register 7 therein. The bilinear adder 9 receives pixel data from the dot register 7 and the dot buffer 8, and performs bilinear interpolation according to a pair of weighing coefficients α, 1-α from the horizontal scaling controller 10. The structure of the bilinear adder 9 is similar to that of the bilinear adder 5 shown in FIG. 2. In the bilinear adder 9, however, pixel data from the dot buffer 8, which corresponds to an (n')th pixel data of the scan line data from the bilinear adder 5, is multiplied by the coefficient 1-α, while pixel data from the dot register 7, which corresponds to an (n'+1)th pixel data of the scan line data from the bilinear adder 5, is multiplied by the coefficient α. Thus, the dot register 7 is equivalent to the line memory 3 of the vertical scaling unit, while the dot buffer 8 is equivalent to the line buffer 4 of the vertical scaling unit.

The structure of the horizontal scaling controller 10 is substantially similar to that of the vertical scaling controller 6 shown in FIGS. 3 to 6. Minor differences between the two controllers 6, 10 exist. For example, in the horizontal scaling controller 10, the first register of the programmable register set is used to store the number (N') of pixel data per original scan line of the digital image in the frame memory 2, and the second register is used to store the number (▲N') of pixel data to be interpolated or deleted per scan line. The third register stores an INC/DEC flag that is used to indicate whether scaling-up or scaling-down of the digital image in a horizontal direction is to be performed. The clock input to the address generator, the alpha series generator and the residue distributor is the original pixel clock. The address output of the address register of the horizontal scaling controller 10 is a dot address that is used to control the line memory 3 and the line buffer 4. Thus, during scaling-up in a horizontal direction, all of the pixel data of (n)th and (n+1)th ones of the original scan lines and the interpolated scan lines therebetween, if any, pass through the bilinear adder 5. When scaling-down in both vertical and horizontal directions, only selected ones of the pixel data of the chosen ones of the original scan lines pass through the bilinear adder 5.

Since the apparatus of the present invention is a dedicated hardware device, real-time scaling-up of digital images is possible. In addition, uniform scaling of a digital image with (N) scan lines (or (N') pixel data per scan line) is possible even if the total number of interpolated scan lines (or interpolated pixel data per scan line) is not a multiple of (N−1) (or (N'−1)). Furthermore, the scaling apparatus of the present invention can be used to scale-up or scale-down a digital image selectively in any of the horizontal and vertical directions. The objectives of the present invention are thus met.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

We claim:

1. A method for processing an digital image to obtain a uniformly scaled desired digital image, the original digital image having, a number (N) of successive original image data, the desired digital image having a number (M) of successive desired image data, the number (M) being greater than the number (N), said method comprising the steps of;

providing a first linear interpolator;

controlling said first linear interpolator to perform a linear interpolation of (n)th and (n+1)th ones of the original image data to produce a residual interpolated image data inserted therebetween when division of (M–N) by (N–1) results in a remainder (S) and when (n) is a minimum number which meets a condition (n+1)*(S)>(s)*(N), wherein (s) range from 1 to (S); and controlling said first linear interpolator to perform a linear interpolation of the (n)th and (n+1)th ones of the original image data to produce an additional number (T) of successive interpolated image data inserted therebetween when (M–N) is larger than (N–1), the number (T) being equal to a quotient resulting from the division of (M–N) by (N–1).

2. The method as claimed in claim 1, wherein said first linear interpolator is a bilinear adder.

3. A method for processing an original digital image to obtain a uniformly scaled desired digital image, the original digital image having a number (N) of successive original image data, the desired digital image having a number (M) of successive desired image data, the number (M) being greater than the number (N), said method comprising the steps of:

providing a first linear interpolator; and controlling said first linear interpolator to perform a linear interpolation of (n)th and (n+1)th ones of the original image data to produce a residual interpolated image data inserted therebetween when division of (M–N) by (N–1) results in a remainder (S) and when (n) is a minimum number which meets a condition (n+1)*(S)>(s)*(N), Wherein (s) ranges from 1 to (S);

said controlling step including the steps of:

(I-1) storing the number (S) in a data register;

(I-2) adding the number (S) and the number stored in said data register to obtain a sum;

(I-3) comparing the sum with the number (N);

(I-4) when the sum is at least equal to the number (N), controlling said first linear interpolator to produce the residual interpolated image data inserted between the (n)th and (n+1)th ones of the original image data, subtracting the number (N) from the sum, and storing resulting difference in said data register; and when the sum is less than the number (N), storing the sum in said data register; and (I-5) repeating steps (I-2) to (I-4) by incrementing (n) by 1 until (n) equals (N).

4. A method for processing an original digital image to obtain a uniformly scaled desired digital image, the original digital image having a number (N) of successive original image data, the desired digital image having a number (M) of successive desired image data, the number (M) being greater than the number (N), said method comprising the steps of:

providing a first linear interpolator; and controlling said first linear interpolator to perform a linear interpolation of (n)th and (n+1)th ones of the original image data to produce a residual interpolated image data inserted therebetween when division of (M–N) by (N–1) results in a remainder (S) and when (n) is a minimum number which meets a condition (n+1)*(S)>(s)*(N), wherein (s) ranges from 1 to (S);

the original image data being scan line data.

5. The method as claimed in claim 4, wherein each of the original image data has a number (N') of successive original pixel data and each of the desired image data has a number (M') of successive desired pixel data, the number (M') being greater than the number (N'), said method further comprising the steps of:

providing a second linear interpolator; and controlling said second linear interpolator to perform a linear interpolation of (n')th and (n'+1)th ones of the original pixel data of each of the original image data to produce a residual interpolated pixel data inserted therebetween when division of (M'–N') by (N'–1) results in a remainder (S') and when (n') is a minimum number which meets a condition (n'+1)*(S')≧(s')*(N'), wherein (s') ranges from 1 to (S').

6. The method as claimed in claim 5, further comprising the step of controlling said second linear interpolator to perform a linear interpolation of the (n')th and (n'+1)th ones of the original pixel data of each of the original image data to produce an additional number (T') of successive interpolated pixel data inserted therebetween when (M'–N') is larger that (N'–1), the number (T') being equal to a quotient resulting from the division of (M'–N') by (N'–1).

7. The method as claimed in claim 6, wherein said second linear interpolator is a bilinear adder.

8. The method as claimed in claim 5, wherein said controlling step comprises the steps of:

(II-1) storing the number (S') in a data register;

(II-2) adding the number (S') and the number stored in said data register to obtain a sum;

(II-3) comparing the sum with the number (N');

(II-4) when the sum is at least equal to the number (N'), controlling said second linear interpolator to produce the residual interpolated pixel data inserted between the (n')th and (n'+1)th ones of the original pixel data, subtracting the number (N') from the sum, and storing resulting difference in said data register; and when the sum is less than the number (N'), storing the sum in said data register; and (II-5) repeating steps (II-2) to (II-4) by incrementing (n') by 1 until (n') equals (N').

9. The method as claimed in claim 4, wherein each of the original image data has a number (N') of successive original pixel data and each of the desired image data has a number (M') of successive desired pixel data, the number (M') being less than the number (N'), said method further comprising the steps of:

(III-1) storing one of the original image data in a memory unit;

(III-2) providing an address generator which controls said memory unit to output a first one of the original pixel data;

(III-3) storing a number (U'), which is a remainder that results from division of the number (N') by the number (M'), in a data register;

(III-4) adding the number (U') and the number stored in said data register to obtain a sum;

(III-5) comparing the sum with the number (M');

(III-6) activating said address generator to control said memory unit to output another one of the original pixel data, said another one of the original pixel data being offset from an immediately preceding original pixel data outputted by said memory unit by a number (V') equal to a quotient that results from the division of the number (N') by the number (M') when the sum is less than the number (M'), and by a number (V'+1) when the sum is at least equal to the number (M');

(III-7) when the sum is at least equal to the number (M'), subtracting the number (M') from the sum and storing resulting difference in said data register; and when the sum is less than the number (M'), storing said sum in said data register; and (III-8) repeating steps (III-4) to (III-7) until (M') original pixel data have been outputted by said memory unit.

10. A method for processing an original digital image to obtain a uniformly scaled desired digital image, the original digital image having a number (N) of successive original image data, the desired digital image having a number (M) of successive desired image data, the number (M) being greater than the number (N), said method comprising the steps of:

providing a first linear interpolator; and controlling said first linear interpolator to perform a linear interpolation of (n)th and (n+1)th ones of the original image data to produce a residual interpolated image data inserted therebetween when division of (M−N) by (N−1) results in a remainder (S) and when (n) is a minimum number which meets a condition (n+1)*(S)>(s)*(N), wherein (s) ranges from 1 to (S);

the original image data being original pixel data of one scan line.

11. A method for processing an original digital image to obtain a uniformly scaled desired digital image, the original digital image having a number (N) of successive original image data, the desired digital image having a number (M) of successive desired image data, the number (M) being less than the number (N), said method comprising the steps of:

(I-1) storing the original image data in a memory unit;

(I-2) providing an address generator which controls said memory unit to output a first one of the original image data;

(I-3) storing a number (U), which is a remainder that results from division of the number (N) by the number (M), in a data register;

(I-4) adding the number (U) and the number stored in said data register to obtain a sum;

(I-5) comparing the sum with the number (M);

(I-6) activating said address generator to control said memory unit to output another one of the original image data, said another one of the original image data being offset from an immediately preceding original image data outputted by said memory unit by a number (V) equal to a quotient that results from the division of the number (N) by the number (M) when the sum is less than the number (M), and by a number (V+1) when the sum is at least equal to the number (M);

(I-7) when the sum is at least equal to the number (M), subtracting the number (M) from the sum and storing resulting difference in said data register; and when the sum is less than the number (M), storing the sum in said data register; and (I-8) repeating steps (I-4) to (I-7) until (M) original image data have been outputted by said memory unit.

12. The method as claimed in claim 11, wherein the original image data is scan line data.

13. The method as claimed in claim 12, wherein each of the original image data has a number (N') of successive original pixel data and each of the desired image data has a number (M') of successive desired pixel data, the number (M') being greater than the number (N'), said method further comprising the steps of:

providing a linear interpolator; and controlling said linear interpolator to perform a linear interpolation of (n')th and (n'+1)th ones of the original pixel data of each of the original image data to produce a residual interpolated pixel data inserted therebetween when division of (M'−N') by (N'−1) results in a remainder (S') and when (n') is a minimum number which meets a condition (n'+1)*(S')≧(s')*(N'), wherein the number (s') ranges from 1 to (S').

14. The method as claimed in claim 13, further comprising the step of controlling said linear interpolator to perform a linear interpolation of the (n')th and (n'+1)th ones of the original pixel data of each of the original image data to produce an additional number (T') of successive interpolated pixel data inserted therebetween when (M'−N') is larger than (N'−1), the number (T') being equal to a quotient resulting from the division of (M'−N') by (N'−1).

15. The method as claimed in claim 14, wherein said linear interpolator is a bilinear adder.

16. The method as claimed in claim 13, wherein said controlling step comprises the steps of:

(II-1) storing the number (S') in a data register;

(II-2) adding the number (S') and the number stored in said data register to obtain a sum;

(II-3) comparing the sum in step (II-2) with the number (N');

(II-4) when the sum in step (II-2) is at least equal to the number (N'), controlling said linear interpolator to produce the residual interpolated pixel data inserted between the (n')th and (n'+1)th ones of the original pixel data, subtracting the number (N') from the sum in step (II-2), and storing resulting difference in said data register; and when the sum in step (II-2) is less than the number (N'), storing said sum in said data register;

(II-5) repeating steps (II-2) to (II-4) by incrementing (n') by 1 until (n') equals (N').

17. The method as claimed in claim 12, wherein each of the original image data has a number (N') of successive original pixel data and each of the desired image data has a number (M') of successive desired pixel data, the number (M') being less than the number (N'), said method further comprising the steps of:

(III-1) storing one of the original image data in a memory unit;

(III-2) providing an address generator which controls said memory unit to output a first one of the original pixel data;

(III-3) storing a number (U'), which is a remainder that results from division of the number (N') by the number (M'), in a data register;

(III-4) adding the number (U') and the number stored in said data register to obtain a sum;

(III-5) comparing the sum in step (III-4) with the number (M');

(III-6) activating said address generator to control said memory unit to output another one of the original pixel data, said another one of the original pixel data being offset from an immediately preceding original pixel data outputted by said memory unit by a number (V') equal to a quotient that results from the division of the number (N') by the number (M') when the sum in step (III-4) is less than the number (M'), and by a number (V'+1) when the sum in step (III-4) is at least equal to the number (M');

(III-7) when the sum in step (III-4) is at least equal to the number (M'), subtracting the number (M') from the sum in step (III-4) and storing resulting difference in said data register; and when the sum in step (III-4) is less than the number (M'), storing said sum in said data register; and (III-8) repeating steps (III-4) to (III-7) until (M') original pixel data have been outputted by said memory unit.

18. The method as claimed in claim 11, wherein the original image data is original pixel data of one scan line.

19. An apparatus for processing an original digital image to obtain a uniformly scaled desired digital image, the original digital image having a number (N) of successive original image data, the desired digital image having a number (M) of successive desired image data, the number (M) being greater than the number (N), said apparatus comprising:

first linear interpolator; and first controller means, connected to said first linear interpolator, for controlling said first linear interpolator to perform a linear interpolation of (n)th and (n+1)th ones of the original image data to produce a residual interpolated image data inserted therebetween when division of (M−N) by (N−1) results in a remainder (S) and when (n) is a minimum number which meets a condition (n+1)*(S)>(s)*(N), wherein (s) ranges from 1 to (S), said first controller means further controlling said first linear interpolator to perform a linear interpolation of the (n)th and (n+1)th ones of the original image data to produce an additional number (T) of successive interpolated image data inserted therebetween when (M−N) is larger than (N−1), the number (T) being equal to a quotient resulting from the division of (M−N) by (N−1).

20. The apparatus as claimed in claim 19, wherein said first linear interpolator is a bilinear adder.

21. An apparatus for processing an original digital image to obtain a uniformly scaled desired digital image, the original digital image having a number (N) of successive original image data, the desired digital image having, a number (M) of successive desired image data, the number (M) being greater than the number (N), said apparatus comprising;

a first linear interpolator; and first controller means, connected to said first linear interpolator, for controlling said first linear interpolator to perform a linear interpolation of (n)th and (n+1)th ones of the original image data to produce a residual interpolated image data inserted therebetween when division of (M−N) by (N−1) results in a remainder(S) and when (n) is a minimum number which meets a condition (n+1)*(S)>(s)*(N), wherein (s) ranges from 1 to (S);

the original image data being scan line data.

22. The apparatus as claimed in claim 21, wherein each of the original image data has a number (N') of successive original pixel data and each of the desired image data has a number (M') of successive desired pixel data, the number (M') being greater than the number (N'), said apparatus further comprising:

a second linear interpolator; and second controller means, connected to said second linear interpolator, for controlling said second linear interpolator to perform a linear interpolation of (n')th and (n'+1)th ones of the original pixel data of each of the original image data to produce a residual interpolated pixel data inserted therebetween when division of (M'−N') by (N'−1) results in a remainder (S') and when (n') is a minimum number which meets a condition (n'+1)*(S')≧(s')*(N'), wherein (s') ranges from 1 to (S').

23. The apparatus as claimed in claim 22, wherein said second controller means further controls said second linear interpolator to perform a linear interpolation of the (n')th and (n'+1)th ones of the original pixel data of each of the original image data to produce an additional number (T') of successive interpolated pixel data inserted therebetween when (M'−N') is larger than (N'−1), the number (T') being equal to a quotient resulting from the division of (M'−N') by (N'−1).

24. The apparatus as claimed in claim 23, wherein said second linear interpolator is a bilinear adder.

25. The apparatus as claimed in claim 21, wherein each of the original image data has a number (N') of successive original pixel data and each of the desired image data has a number (M') of successive desired pixel data, the number (M') being less than the number (N'), said apparatus further comprising:

a memory unit for storing one of the original image data therein;

an address generator, connected to said memory unit, for controlling said memory unit to output a first one of the original pixel data;

generating means for generating a number (U'), which is a remainder that results from division of the number (N') by the number (M');

a data register;

adder means, connected to said generating means and said data register, for adding the number (U') and the number stored in said data register to obtain a sum; and computing means, connected to said adder means, said address generator and said data register, for comparing the sum with the number (M') and for activating said address generator to control said memory unit to output another one of the original pixel data, said another one of the original pixel data being offset from an immediately preceding original pixel data outputted by said memory unit by a number (V') equal to a quotient that results from the division of the number (N') by the number (M') when the sum is less than the number (M'), and by a number (V'+1) when the sum is at least equal to the number (M');

said computing means storing difference of the number (M') and the sum in said data register when the sum is at least equal to the number (M'), and storing the sum in said data register when the sum is less than the number (M').

26. An apparatus for processing an original digital image to obtain a uniformly scaled desired digital image, the original digital image having a number (N) of successive original image data, the desired digital image having a number (M) of successive desired image data, the number (M) being greater than the number (N), said apparatus comprising:

a first linear interpolator; and first controller means, connected to said first linear interpolator, for controlling said first linear interpolator to perform a linear interpolation of (n)th and (n+1)th ones of the original image data to produce a residual interpolated image data inserted therebetween when division of (M−N) by (N−1) results in a remainder(S) and when (n) is a minimum number which meets a condition (n+1)*(S)>(S)*(N), wherein (s) ranges from 1 to (S);

the original image data being pixel data of one scan line.

27. An apparatus for processing an original digital image to obtain a uniformly scaled desired digital image, the original digital image having a number (N) of successive original image data, the desired digital image having a number (M) of successive desired image data, the number (M) being less than the number (N), said apparatus comprising:

a first memory unit for storing the original image data therein;

a first address generator, connected to said first memory unit, for controlling said first memory unit to output a first one of the original image data;

first generating means for generating a number (U), which is a remainder that results from division of the number (N) by the number (M);

a first data register;

first adder means, connected to said first generating means and said first data register, for adding the number (U) and the number stored in said first data register to obtain a sum; and first computing means, connected to said first adder means, said first address generator and said first data register, for comparing the sum with the number (M) and for activating said first address generator to control said first memory unit to output another one of the original image data, said another one of the original image data being offset from an immediately preceding original image data outputted by said first memory unit by a number (V) equal to a quotient that results from the division of the number (N) by the number (M) when the sum is less than the number (M), and by a number (V+1) when the sum is at least equal to the number (M);

said first computing means storing difference of the number (M) and the sum in said first data register when the sum is at least equal to the number (M), and storing the sum in said first data register when the sum is less than the number (M).

28. The apparatus as claimed in claim 27, wherein the original image data is scan line data.

29. The apparatus as claimed in claim 28, wherein each of the original image data has a number (N') of successive original pixel data and each of the desired image data has a number (M') of successive desired pixel data, the number (M') being greater than the number (N'), said apparatus further comprising:

a linear interpolator; and controller means, connected to said linear interpolator, for controlling said linear interpolator to perform a linear interpolation of (n')th and (n'+1)th ones of the original pixel data of each of the original image data to produce a residual interpolated pixel data inserted therebetween when division of (M'−N') by (N'−1) results in a remainder (S') and when (n') is a minimum number which meets a condition (n'+1)*(S') ≧(s')*(N'), wherein the number (s') ranges from 1 to (s').

30. The apparatus as claimed in claim 29, wherein said controller means further controls said linear interpolator to perform a linear interpolation of the (n')th and (n'+1)th ones of the original pixel data of each of the original image data to produce an additional number (T') of successive interpolated image data inserted therebetween when (M'−N') is larger than (N'−1), the number (T') being equal to a quotient resulting from the division of (M'−N') by (N'−1).

31. The apparatus as claimed in claim 30, wherein said linear interpolator is a bilinear adder.

32. The apparatus as claimed in claim 28, wherein each of the original image data has a number (N') of successive original pixel data and each of the desired image data has a number (M') of successive desired pixel data, the number (M') being less than the number (N'), said apparatus further comprising:

a second memory unit for storing one of the original image data therein;

a second address generator, connected to said second memory unit, for controlling said second memory unit to output a first one of the original pixel data;

second generating means for generating a number (U'), which is a remainder that results from division of the number (N') by the number (M');

a second data register;

second adder means, connected to said second generating means and said second data register, for adding the number (U') and the number stored in said second data register to obtain a sum; and second computing means, connected to said second adder means, said second address generator and said second data register, for comparing the sum with the number (M') and for activating said second address generator to control said second memory unit to output another one of the original pixel data, said another one of the original pixel data being offset from an immediately preceding original pixel data outputted by said second memory unit by a number (V') equal to a quotient that results from the division of the number (N') by the number (M') when the sum is less than the number (M'), and by a number (V'+1) when the sum is at least equal to the number (M');

said second computing means storing difference of the number (M') and the sum in said second data register when the sum is at least equal to the number (M'), and storing the sum in said second data register when the sum is less than the number (M').

33. The apparatus as claimed in claim 27, wherein the original image data is original pixel data of one scan line.

* * * * *

UNITED STATES PATENT AND TRADEMARK OFFICE
CERTIFICATE OF CORRECTION

PATENT NO. : 5,621,870
DATED : April 15, 1997
INVENTOR(S) : R.-F. Shyu et al.

It is certified that error appears in the above-indentified patent and that said Letters Patent is hereby corrected as shown below:

| COLUMN | LINE | |
|---|---|---|
| 11 (Claim 1, | 2 line 1) | "an digital" should read --an original digital-- |
| 11 (Claim 1, | 4 line 3) | After "having" delete "," |
| 11 (Claim 1, | 7 line 6) | After "of" delete ";" and insert --:-- |
| 11 (Claim 1, | 19-20 lines 18-19) | "ther-ebetween" should instead be hyphenated as --there-between-- |
| 11 (Claim 3, | 39 line 15) | "Wherein" should read --wherein-- |
| 11 (Claim 3, | 53 line 29) | "(I-5)" should be indented farther to the right to line up vertically under "(I-4)" |
| 15 (Claim 21, | 43 line 4) | After "having" delete "," |
| 15 (Claim 21, | 46 line 7) | After "comprising" delete ";" and insert --:-- |

UNITED STATES PATENT AND TRADEMARK OFFICE
CERTIFICATE OF CORRECTION

PATENT NO. : 5,621,870
DATED : April 15, 1997
INVENTOR(S) : R.-F. Shyu et al.

It is certified that error appears in the above-indentified patent and that said Letters Patent is hereby corrected as shown below:

| COLUMN | LINE | | |
|---|---|---|---|
| 17 (Claim 26, | 2 line 16) | "(n+1)*(S)>(S)*(N)," should read --(n+1)*(S)>(s)*(N),-- | |
| 18 (Claim 29, | 4 line 16) | "1 to (s')." should read --1 to (S').-- | |

Signed and Sealed this

Ninth Day of September, 1997

BRUCE LEHMAN

*Attest:*

*Attesting Officer*  *Commissioner of Patents and Trademarks*